United States Patent
Tzeng et al.

(10) Patent No.: US 8,909,008 B1
(45) Date of Patent: Dec. 9, 2014

(54) ACTIVE OPTICAL ROTARY COUPLER

(75) Inventors: Shing-Wu P. Tzeng, Irvine, CA (US); Ding-Wei Cheng, New Taipei (TW); Chien-Jen Lin, Zhubei (TW); Chih-Hao Liu, Zhubei (TW)

(73) Assignee: Owlink Technology, Inc., Tustin, CA (US)

( * ) Notice: Subject to any disclaimer, the term of this patent is extended or adjusted under 35 U.S.C. 154(b) by 387 days.

(21) Appl. No.: 13/430,483

(22) Filed: Mar. 26, 2012

(51) Int. Cl.
*G02B 6/26* (2006.01)

(52) U.S. Cl.
USPC .................. 385/26; 385/25; 385/31

(58) Field of Classification Search
None
See application file for complete search history.

(56) References Cited

U.S. PATENT DOCUMENTS

| | | |
|---|---|---|
| 4,124,272 A | 11/1978 | Henderson et al. |
| 5,007,697 A | 4/1991 | Chadha |
| 5,039,193 A | 8/1991 | Snow et al. |
| 8,380,024 B1 * | 2/2013 | Zhang et al. ............ 385/26 |
| 2007/0217736 A1 * | 9/2007 | Zhang et al. ............ 385/26 |
| 2012/0213472 A1 * | 8/2012 | Violante et al. .......... 385/26 |

* cited by examiner

*Primary Examiner* — Tina Wong
(74) *Attorney, Agent, or Firm* — Fenwick & West LLP

(57) ABSTRACT

Optical signals are transmitted across a rotary junction using an active optical rotary coupler. A rotary optical joint assembly includes a rotatable optical coupler and an optical signal processing system. The rotatable optical coupler aligns two optical fibers for optical communication across a rotary optical junction. The optical signal processing system includes a local optical transceiver that receives the signals and compensates for at least a portion of signal loss or other signal imperfections incurred from transmitting the signal across the rotary optical junction. The local optical transceiver also processes the signals for longer distance transmission.

14 Claims, 3 Drawing Sheets

ACTIVE OPTICAL ROTARY COUPLER

TECHNICAL FIELD

Embodiments of the present disclosure are directed to optical couplers. In particular, embodiments of the present disclosure are directed to active optical rotary couplers.

BACKGROUND

Data sources, such as video cameras, are often linked to a remotely located data destination, such as a data storage or processing facility, by an optical and/or electrical connection. For data sources that move or rotate (for example, a remotely articulated rotatable dome-type video camera), the linkage between the data source and the data destination can include a rotary coupler connected to a fiber or cord. The rotary coupler prevents the fiber or cord from becoming twisted as the data source moves or rotates with respect to the data destination.

Typical rotary couplers, for example those described in U.S. Pat. Nos. 4,124,272 and 5,039,193, are passive; that is, the couplers do not include electronic components requiring electricity. The passive couplers described in these patents use lens relay optics and mechanical tolerance control to reduce signal degradation caused by transmission of the signal across the rotary junction. In other optical rotary couplers, such as those described in U.S. Pat. No. 5,007,697, the optical signal is converted to an electrical signal to facilitate transmission across the rotary junction. In still other optical rotary couplers, the dimensions and tolerances of coupler components are tightly controlled to minimize signal degradation by dispersion or mode launch effects caused by misalignment of optical coupler components.

SUMMARY

Embodiments of the invention include apparatus, systems, and methods for transmitting optical signals across a rotary junction using an active optical rotary coupler. In one embodiment, a rotary optical joint assembly includes a rotatable optical coupler and an optical signal processing system. The rotatable optical coupler aligns two optical fibers for optical communication across a rotary optical junction. The optical signal processing system includes a local optical transceiver that receives the signals and compensates for at least a portion of signal loss or other signal imperfections incurred from transmitting the signal across the rotary optical junction. The local optical transceiver also processes the signals for longer distance transmission.

One embodiment of the rotatable optical coupler includes a first optical fiber having a first optical joint end and a first longitudinal axis, and a stationary ferrule substantially disposed around the first optical fiber. The stationary ferrule permits the first optical joint end to remain exposed without directly contacting the joint or the optical fiber. The embodiment also includes a second optical fiber having a second optical joint end and a second longitudinal axis, and a rotatable ferrule substantially disposed around the second optical fiber, wherein the rotatable ferrule permits the second optical joint end to remain exposed without directly contacting the joint or the optical fiber. This arrangement is such that the first optical joint end is proximate to the second optical joint end, and the first longitudinal axis is substantially aligned with the second longitudinal axis. An alignment sleeve is substantially disposed around the stationary ferrule and the rotatable ferrule, thereby permitting the rotatable ferrule to rotate with respect to the stationary ferrule while maintaining the substantial axial alignment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments of present disclosure include apparatus, systems, and methods for transmitting optical signals across a rotary junction using an active optical rotary coupler. Embodiments of the active optical rotary coupler described herein can enable rotation of more than 360° of one portion of the coupler with respect to another portion of the coupler. Also, embodiments described herein include using an active optical rotary coupler system for processing an optical signal after transmitting the optical signal across the rotary junction, thereby remediating, removing, or otherwise compensating for the effects of the transmission.

Example Application

Figure 1:
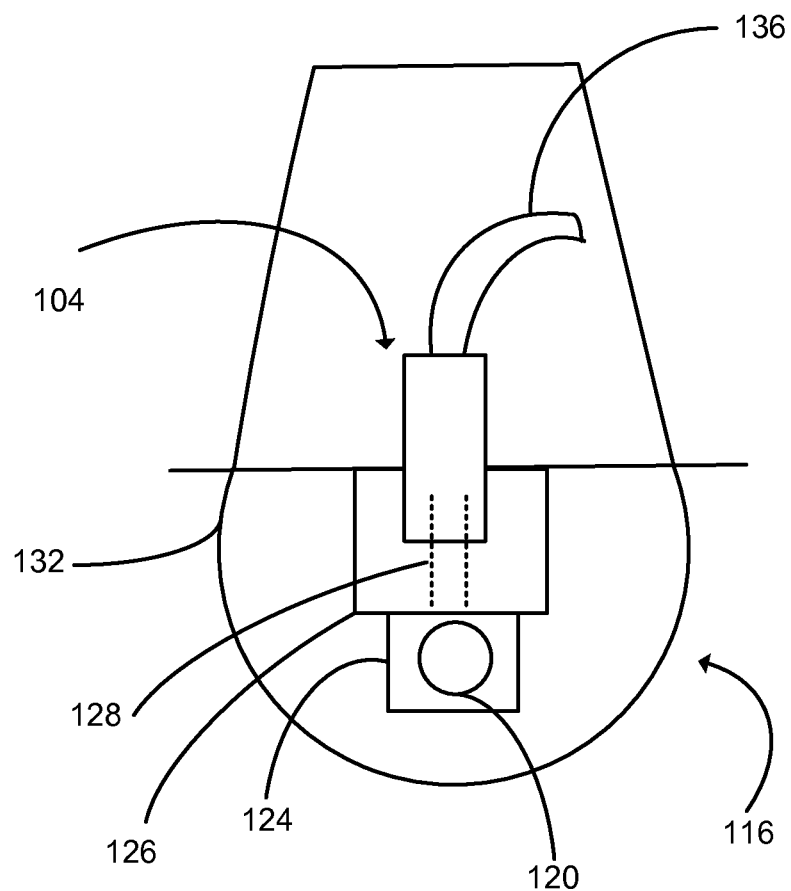
FIG. 1 is an illustration of an example rotatable surveillance camera connected to a signal destination by an optical fiber, wherein an embodiment of an active optical rotary coupler system is used to connect a rotatable camera to an optical fiber.

FIG. 1 schematically illustrates a rotatable surveillance system 100 that includes an active optical rotary coupler system 104 used in conjunction with a remotely rotatable surveillance camera 116. The system 104 includes active components (i.e., components having electronic elements requiring electricity) that compensate for some or all of the loss in signal resulting from its transmission across the rotary junction. The system 104 also includes non-active components that are used to transmit the signal across the rotary junction.

In this embodiment, the rotatable surveillance camera 116 includes a camera 120, a rotatable turret 124, a fixed-orientation housing 126, an internal fiber optic cable segment 128, a protective dome 132, and an external fiber optic cable 136. The camera 120 is mounted to the rotatable turret 124, which can be remotely or automatically articulated by mechanisms within the housing 126, thereby rotating the camera 120. The camera 120 can be rotated in amounts up to, including, and greater than 360°. This rotation is facilitated in part through the use of the active optical rotary coupler system 104, which includes active signal processing components that operate with freely rotatable coupler components that remain in optical communication during rotation.

As images are received by the camera 120, they are converted into optical signals. The signals are sent through the internal fiber optic cable 128 to the active optical rotary coupler system 104, an embodiment of which is described in the context of FIG. 2. Once the optical signals are transmitted across the rotary junction using the active optical rotary coupler system 104, loss from the transmission can be compensated, and the optical signals are transmitted through the external fiber optic cable 136 to a remote data storage or processing facility.

The above-described example application of an active optical rotary coupler is provided for illustration purposes only. It will be appreciated that the methods, systems, and apparatus of the present disclosure can be applied to wide variety of applications.

Active Optical Coupler System

Figure 2:
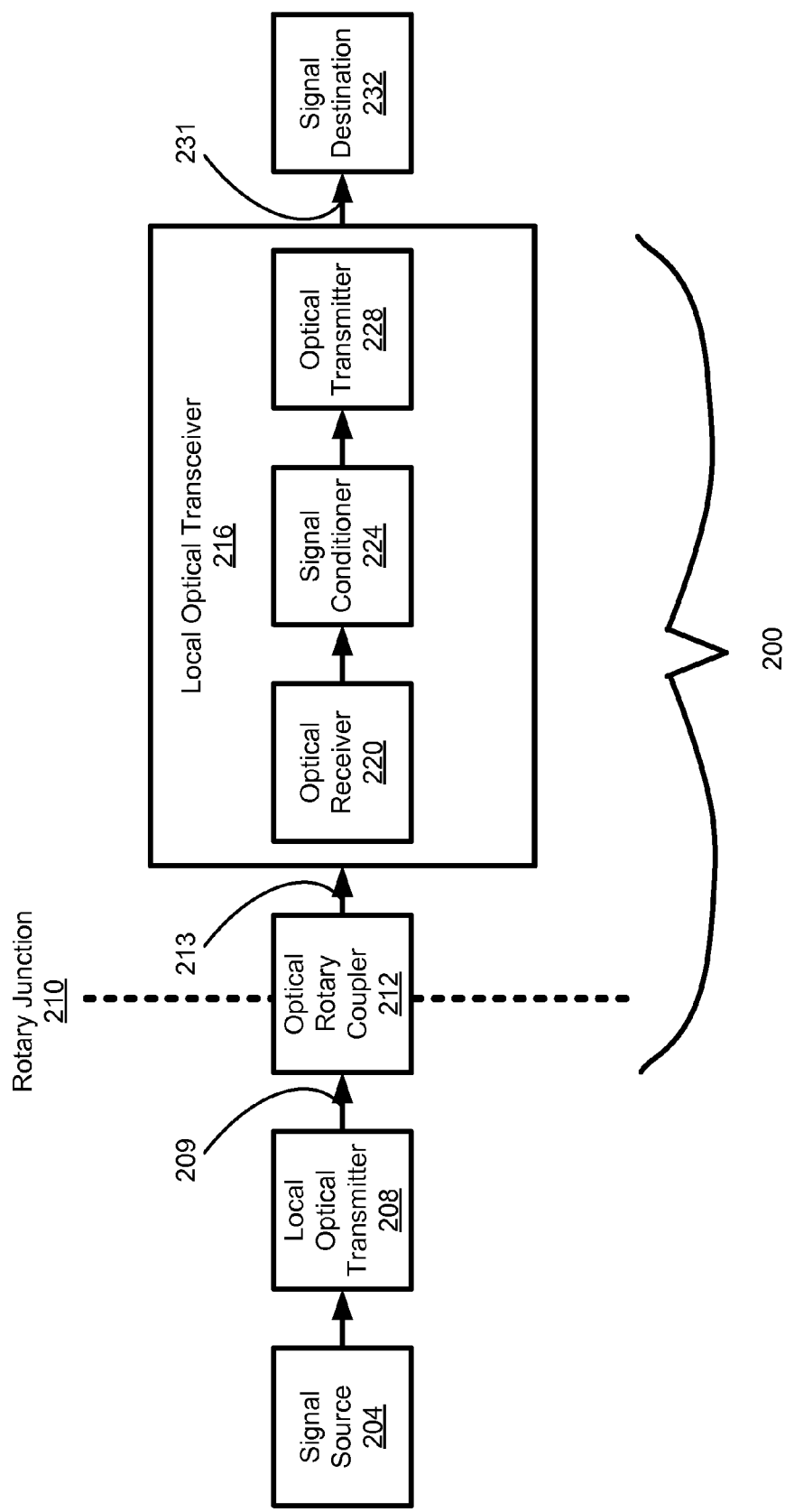
FIG. 2 is a block diagram schematically illustrating example components of an embodiment of an active optical rotary coupler system.

FIG. 2 schematically illustrates components of an embodiment of an active optical rotary coupling system 200. The active components (i.e., components having electronics that require power to operate), described below in more detail, are used to remediate, remove, or compensate for signal loss and/or signal distortion resulting from transmission of an optical signal across the rotary junction through an optical rotary coupler.

In this embodiment, the system 200 includes an optical rotary coupler 212 and a local optical transceiver 216. The local optical transceiver 216 of the system 200 has three sub-elements that can be used to process the optical signal after transmission through the optical rotary coupler 212. These three sub-elements are an optical receiver 220, a signal conditioner 224, and an optical transmitter 228.

Figure 3:
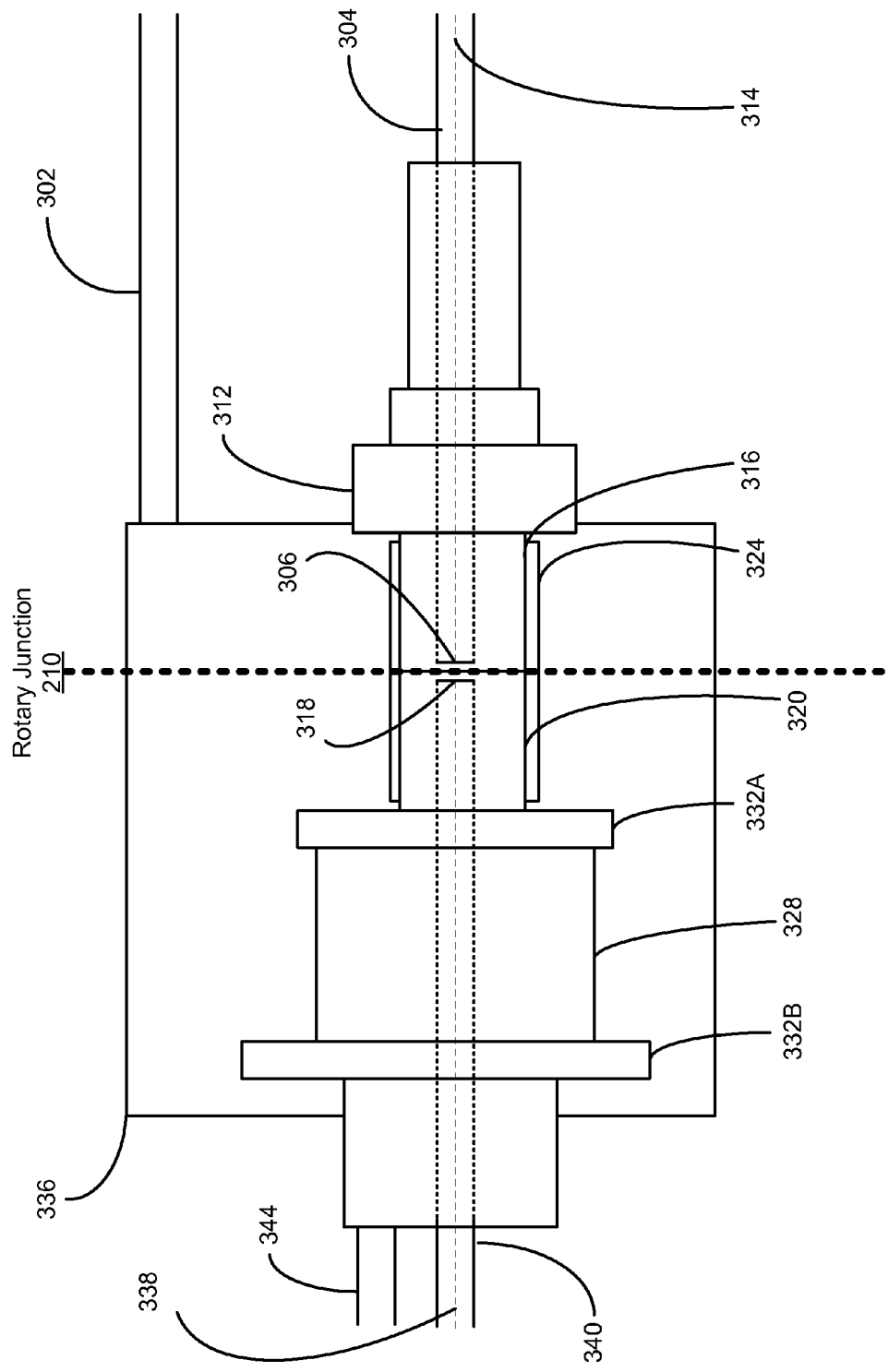
FIG. 3 is a side-view cross-section of a rotary joint mechanism of an optical rotary coupler, in an embodiment.

The local optical transmitter 208 receives signals from a signal source 204 and produces an optical signal for transmission through the optical rotary coupler 212. The local optical transmitter 208, electrically energized by a power source (not shown) can prepare the optical signal for transmission across an optical rotary junction 210, thereby remediating anticipated degradation of the signal resulting from the transmission. The power supply can be in electrical communication with a set of electrical slip rings, as illustrated in FIG. 3, either to facilitate the receipt of, or transfer of, power to the active components on the other side of the rotary joint 210.

The optical signal is transmitted through the rotary junction 210 using the optical rotary coupler 212, wherein the coupler has components on each side of the junction 210. The optical rotary coupler will be explained in more detail in the context of FIG. 3.

The optical receiver 220 receives the optical signal transmitted through the optical rotary coupler 212 by the local optical transmitter 208. The optical receiver 220 can be any type of optical receiver including, for example, a 1.25 Gbps-10 Gbps SFF/SFP optical transceiver by FINISAR, Inc. Other types of optical receivers can also be used.

Once received by the optical receiver 220, the optical signal is processed by the electrically active signal conditioner 224, which is powered, in this example, using a power supply. The signal conditioner 224 compensates, either in whole or in part, for signal artifacts, signal loss, or other signal degradation or imperfections resulting from transmission of the optical signal through the optical rotary coupler 212. In some embodiments of the signal conditioner 224, the quality of the signal sent to a signal destination 232 is better than the quality of the signal transmitted through the optical rotary coupler 212. The electronic circuits of the signal conditioner 224 can include, but are not limited to, amplifiers, limiters, frequency domain filters, time domain filters, and other circuits that can change the amplitude and/or time evolution of the optical signal.

The optical transmitter 228 generates the optical signal to be transmitted to the signal destination 232. Because the optical transmitter 228 receives the electrical signal from the signal conditioner 224 and generates the optical signal transmitted to the signal destination 232, the characteristics of the optical signal can be chosen to fit the distance of transmission, the fiber used for transmission to the destination, the characteristics of the received signal, or combinations thereof. In one embodiment of the optical transmitter 228, the signal sent to the signal destination 232 can be sent over an optical fiber 231 having different fiber characteristics than fibers used elsewhere between the components of FIG. 2, such as fiber 209 between the local optical transmitter 208 and the optical rotary coupler 212, and/or the fiber 213 between the optical rotary coupler 212 and the local optical transceiver 216. For example, while the fiber 213 delivering the signal to the optical receiver 220 can be a multi-mode optical fiber, the fiber 231 transmitting the signal to the signal destination 232 can be a single mode optical fiber. Alternatively, the fiber 231 transmitting the signal to the signal destination 232 may be the only multi-mode fiber among fibers 209, 213 used elsewhere in the system. In another example, because the optical transmitter 228 receives a signal conditioned by the signal conditioner 224, the signal can be tailored to produce a received signal with characteristics more favorable to low error reception than those present in the signal originating from signal source 204. These characteristics can include reduced rise and fall times and reduced signal amplitude fluctuation. In yet other embodiments of the optical transmitter 228, the signal produced by the optical transmitter 228 can have transmission characteristics enabling transmission over distances not achievable using the characteristics of the signal transmitted through the optical rotary coupler 212 and received by the optical receiver 220. For example, the signal produced by the optical transmitter 228 can produce a transmitted signal at an optical power which can exceed the optical power of the received signal, thereby facilitating long distance transmission through fiber 231 to the signal destination 232.

As mentioned above, use of the active components of the local optical transceiver 216 can compensate for losses experienced by the optical signal through the optical rotary coupler 212. In some embodiments the local optical transceiver 216 can even improve the quality or integrity of the signal initially provided to the optical rotary coupler by the local optical transmitter 208. This capability to compensate, either in whole or in part, for losses introduced by transmission through the optical rotary coupler 212 is in contrast to devices in the prior art, in which the coupling system, and the transmitted signal, must bear any transmission-related signal losses. Furthermore, the devices in the prior art attempt to minimize these un-compensated losses through strict dimensional and dimensional tolerance control of the components of the inactive optical coupler components. Because using the active components of the local optical transceiver 216 can compensate for losses, strict dimensional and tolerance control for components of the optical rotary coupler 212 can be relaxed.

Optical Rotary Coupler

FIG. 3 illustrates an embodiment of an optical rotary coupler 212 that conveys optical signals across the rotary junction 210 by receiving an optical signal from the electrically active local optical transmitter 208, and transmitting the signal to the electrically active local optical transceiver 216. For ease of description, FIG. 3 will be described in the context of optical signals flowing from the left-hand side of the optical rotary coupler 212 to the right-hand side. However, it will be appreciated that optical signals can travel in either or both directions through the optical rotary coupler 212 as described herein.

The elements of the optical rotary coupler 212 can be described in two main groups, wherein each group is characterized by its relationship to a stationary drum 336. This grouping is for clarity only, and other embodiments may have different arrangements without departing from the concepts described herein. In this embodiment, the stationary drum 336 is primarily an enclosure for some of the components of the optical rotary coupler 212, and needs no further description.

The components of the first group are disposed substantially outside of the stationary drum 336 and include an input electrical connection 302, a first optical fiber 304 (having a first longitudinal axis 314 and a first optical junction end 306 disposed within the stationary drum), and an anti-rotation collar 312. The components of the second group are disposed substantially within the stationary drum 336. The components of the second group include a stationary optical fiber ferrule 316, a rotatable optical fiber ferrule 320, a ferrule alignment sleeve 324, a rotatable drum 328, electrical slip rings 332A and 332B, and a second optical fiber 340 having a second optical junction end 318 and a second longitudinal axis 338.

Referring to the first group, the input electrical connection 302 is used to power the electrically active components of the system 200. As will be described below, the input electrical connection 302 can also be used with electrical slip rings 332A and 332B and output electrical connection 344 to provide electricity to the active components of the system 200 disposed on another side of the optical rotary junction 210.

The first optical fiber 304 passes through the anti-rotation collar 312 and terminates at an optical junction end 306 within the stationary optical fiber ferrule 316. The first optical fiber 304 can be selected to minimize losses from transmission from and/or to the active elements of the system 200. For example, the signal processing provided by the local optical transmitter 208 and the local optical transceiver 216 permits the use of a single mode or a multi-mode type optical fiber for the first optical fiber 304. Even though the use of single-mode fiber in optical couplers typically requires tight dimensional tolerance control, the active elements can prepare for, compensate for, and/or remediate signal loss and/or signal distortion due to transmission, as explained above. This capability can compensate for signal degradation that would otherwise make the use of single-mode type fiber more challenging.

Furthermore, as explained above in the context of FIG. 2, the type of optical fiber used for the first optical fiber 304 can be selected independently from the types of fibers used elsewhere in the system 200. This independence is achieved by using electrically active elements (e.g., local optical transceiver 216) to process the optical signals transmitted across the rotary junction 210 to remove transmission related defects or otherwise prepare the signal for transmission over a shorter or longer distance. As will be appreciated, the signal characteristics for transmission over the relatively short distance of the optical rotary coupler 212 are different from the signal characteristics required for transmission over tens of kilometers to the signal destination 232.

The anti-rotation collar 312, through which the first optical fiber 304 passes, is connected to the stationary optical fiber ferrule 316 (discussed below) and the stationary drum 336. The anti-rotation collar 312 prevents the first optical fiber 304 and the stationary optical fiber ferrule 316 from rotating during rotation of one portion of the rotary optical coupler.

Referring now to the second group, the stationary optical fiber ferrule 316, attached to the first optical fiber 304 by an adhesive, helps protect the first optical junction end 306 from damage during fabrication and operation of the optical rotary coupler 212. The stationary optical fiber ferrule 316 also facilitates proper positioning of the first optical fiber 304 with respect to the second optical fiber 340, as will be explained in more detail below. The stationary optical fiber ferrule 316 in this example has the shape of a hollow cylinder with open ends. These features enable the first optical fiber 304 to slide through the stationary optical fiber ferrule 316 and permit the junction end 306 to remain exposed. Exposure of the first optical junction end 306 enables optical communication between the first optical fiber 304 and the second optical fiber 340. In this example, the optical fiber ferrule 316 encircles the entire circumference of the first optical fiber 304. In other examples, the stationary optical fiber ferrule 316 may be substantially disposed around the first optical fiber 304 by enclosing most, but not all, of the circumference of the first optical fiber 304. That is, the stationary optical fiber ferrule 316 can have a longitudinal channel exposing a portion of the first optical fiber 304, an array of holes, or other variations.

The rotatable optical fiber ferrule 320 is attached to the second optical fiber 340 using an adhesive and is also attached to the rotatable drum 328. The rotatable optical fiber ferrule 320 performs functions analogous to those performed by the stationary optical fiber ferrule 316. That is, it helps protect the second optical junction end 318 from damage during fabrication and operation of the optical rotary coupler 212, and facilitates proper positioning of the second optical fiber 340 with respect to the first optical fiber 304. The rotatable optical fiber ferrule 320 also has the same hollow, cylindrical shape that is entirely or substantially disposed around the second optical fiber 340 as the stationary optical fiber ferrule 316 is around the first optical fiber 304. As explained above, this leaves the second optical junction end 318 exposed, thereby enabling optical communication between the first optical fiber 304 and the second optical fiber 340.

The ferrule alignment sleeve 324, in cooperation with ferrules 316 and 320, is used to facilitate substantial axial alignment (that is, alignment sufficient to permit optical communication between the optical fibers 304 and 340) between the first longitudinal axis 314 and the second longitudinal axis 338. The ferrule alignment sleeve 324 limits the transverse (i.e., perpendicular to the longitudinal axes 314 and 338) movement of the second optical fiber 340 relative to the first optical fiber 304. This alignment and the maintenance of the alignment helps maintain optical communication between optical joint ends 306 and 318, thereby facilitating transfer of optical signals from one side of the optical rotary junction to the other through the optical rotary coupler 212, even when the optical fibers 304 and 340 (and attached ferrules 316 and 320) are rotating relative to one another.

To accomplish these functions, the ferrule alignment sleeve 324 extends substantially over the combined length of the ferrules 316 and 320, thereby helping to maintain transverse registry between optical joint ends 306 and 318. In this example, the ferrule alignment sleeve 324 extends over nearly the entire lengths of both ferrules 316 and 320, although in other examples the alignment sleeve can extend over as little as one half of each of the ferrules. In another example, the ferrule alignment sleeve 324 can extend over the entire length of both ferrules 316 and 320. In still another example, the ferrule alignment sleeve 324 can asymmetrically extend over the entire length of one ferrule while extending over only a portion of the other ferrule.

Furthermore, because the alignment sleeve 324 depicted in FIG. 3 extends over some or all of both ferrules 316 and 320, the ferrule alignment sleeve 324 helps maintain transverse registry between optical joint ends 306 and 318 even when the rotatable optical fiber ferrule 320 and/or second optical joint end 318 precess during rotation of the second optical fiber 340 and the rotatable ferrule 320. Therefore, when the rotatable optical fiber ferrule 320 changes its transverse position during rotation due to, for example, dimensional variation, the stationary optical fiber ferrule 316 can be forced to shift transversely by the alignment sleeve 324, thereby helping to maintain registry.

In this example, the alignment sleeve 324 is disposed entirely or substantially around the circumferences of the ferrules 316 and 320. That is, the alignment sleeve 324 can entirely encircle the ferrules 316 and 320, or can encircle most, but not all, of the circumferences of the ferrules. In another example, the alignment sleeve 324 is disposed substantially around the circumference of the ferrules 316 and 320 in a split-sleeve arrangement in which a channel of material is removed from the sleeve to expose a section of both of the ferrules. Other arrangements in which the alignment sleeve 324 is disposed substantially, but not entirely, around the circumferences of the ferrules 316 and 320 are possible.

In this embodiment, the ferrules 316 and 320, and the alignment sleeve 324 are fabricated from a material that can be machined or processed to tight mechanical tolerances, thereby reducing or minimizing precession and/or other dimensional mismatches. However, as mentioned above, these mechanical tolerances and other dimensional controls can be relaxed because of the signal compensation provided by the local optical transceiver 216 after transmission of the signal through the optical rotary coupler 212. In some embodiments, the material does not elastically or plastically deform except under very high stresses, has a low coefficient of thermal expansion, and can be used to physically support the optical fiber during processing (e.g., polishing of end 306 and 318). In this embodiment, the ferrules are made from a ceramic material, but glass-ceramics, tungsten, titanium, high-strength steel, inter-metallic compounds, and others, can also be used.

In the foregoing discussion, the stationary optical fiber ferrule 316, rotatable optical fiber ferrule 320, and the ferrule alignment sleeve 324 are all fabricated using fabrication techniques enabling tight dimensional tolerance control. In some embodiments, the ferrules 316 and 320 are several millimeters long, and the ferrule alignment sleeve 324 is approximately 75% of the combined ferrule length. However, these materials and dimensions can be varied according to specific design requirements.

In some cases, the ferrule alignment sleeve 324 cannot completely align the optical ends 306 and 318. For situations in which the optical ends 306 and 318 are misaligned, the centers of the optical ends will precess relative to one another during operation of the optical rotary coupler 212. This precession can introduce a variety of signal defects. For example, as the precession occurs, the optical signal transmitted from the second optical end 318 moves transversely (that is, perpendicular to longitudinal axes 314 and 338) on the first optical end 306. This precession changes the path that the signal follows as is travels through the second optical fiber 340 causing transmission errors due to signal amplitude changes or signal pulse width variation. The active components, described above, can correct or mitigate some of these errors, thereby compensating for misalignment.

In this embodiment, the optical joint is assembled using the ferrules 316 and 320 within alignment sleeve 324, such that the optical joint end 306 of the first optical fiber 304 and the optical joint end 318 of the second optical fiber 340 are situated proximate to one another, but separated by a gap. This gap helps prevent either of the optical joint ends 306 and 318 from being damaged during operation caused by one end contacting the other. In some embodiments, the gap is less than approximately 200 microns wide to limit the loss in the optical connection to a value that can be tolerated by the system 200 (e.g., components 208 and 216) without generating unrecoverable data errors. In other embodiments, the gap is designed in light of the performance of the local optical transmitter 208 such that the signal loss across the gap maintains the signal integrity when received at the optical receiver 220. In some embodiments of the optical receiver 220, this signal loss is less than the optical receiver link loss margin. In still other embodiments, the gap is filled with a refractive index-matching gel, thereby facilitating transmission of the signal through the gap.

Continuing with FIG. 3, the rotatable drum 328 is connected to the rotatable optical fiber ferrule 320 such that the rotatable drum 328, the second optical fiber 340, and the rotatable optical fiber ferrule 320 rotate in unison with respect to the stationary optical fiber ferrule 316 and the first optical fiber 304 during rotation of the optical rotary coupler 212.

The rotatable drum 328 also provides a structure on which to mount electrical slip-rings 332A and 332B. The slip-rings 332A and 332B are used to transmit electricity from the input electrical connection 302 to the output electrical connection 344, thereby providing power to electrically active components of the system 200 on the other side of the coupler 212. In some embodiments, the slip-rings 332A and 332B are used to transmit low speed electrical control signals (e.g., according to RS-485 or RS-232 protocols) and/or data through the optical rotary coupler 212. In some examples, the control signals can be used to, for example, articulate a moveable camera acting as the signal source 204. In other examples, the data transmitted using the slip-rings 332A and 332B includes low speed data signals for other purposes.

In this example, the second optical fiber 340 transmits optical signals from the local optical transmitter 208 to the first optical fiber 304, carrying the received signals through the rotating elements of the optical coupler 212. It will be appreciated that the optical coupler 212 can be arranged to transmit signals in the opposite direction or in both directions. As with the first optical fiber 304, the type of optical fiber used for second optical fiber 340 can be selected independently from other types of optical fibers used in the system 200. Also, similar to the first optical fiber 304, the second optical joint end 318 of the second optical fiber 340 is protected and positioned relative to the first optical fiber 304 and the first optical junction end 306 by the rotatable optical fiber ferrule 320. The second optical fiber 340 and the rotatable optical fiber ferrule 320 are connected using an adhesive.

Additional Configuration Considerations

The present invention has been described in particular detail with respect to several possible embodiments. Those of skill in the art will appreciate that the invention may be practiced in other embodiments. For example, in another embodiment (not shown in FIG. 2), the optical receiver 220 can convert the optical signal into an electrical signal. In these cases, the electrical signal is conditioned by the signal conditioner 224 in preparation for further transmission. For example, the signal conditioner 224 can amplify and/or re-time the electrical signal. In another embodiment (not shown in FIG. 2), assuming the output from signal source 204 is optical, the local optical transmitter 208 may be replaced with a second local optical transceiver. The second local optical transceiver can be functionally a duplicate to the first local optical transceiver 216 on the other side of the rotary junction 210. The second local optical transceiver may condition a signal in preparation for transmission across the rotary junction or work cooperatively with the first local optical transceiver 216 to reduce signal loss or other imperfections caused by the transmission across rotary junction 210.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

What is claimed is:

1. A rotary optical joint assembly, comprising:
a rotatable optical coupler, comprising a first optical fiber aligned for optical communication with a second optical fiber across a rotary optical junction; and
an optical signal processing system, comprising:
a local optical transceiver receiving optical signals from the first optical fiber transmitted through the rotatable optical coupler, compensating for at least a portion of signal loss or other signal imperfections incurred from the transmission through the rotatable optical coupler, and processing the signals for longer distance transmission.

2. The rotary optical joint assembly of claim 1, wherein the local optical transceiver comprises:
an optical receiver for receiving optical signals from the rotatable optical coupler;
a signal conditioner for processing the received optical signals, thereby compensating for at least a portion of signal loss or other signal imperfections caused by transmission of the optical signal through the rotatable optical coupler; and
a signal transmitter for transmitting the optical signals to a remote signal destination, the signal transmitter preparing the signal for longer distance transmission.

3. The rotary optical joint assembly of claim 1, further comprising:
an optical fiber connecting the local optical transceiver to the optical rotary coupler, wherein the optical fiber is a multi-mode fiber.

4. The rotary optical joint assembly of claim 1, wherein the rotatable optical coupler comprises:
a first optical fiber having a first optical joint end and a first longitudinal axis;
a stationary ferrule substantially disposed around the first optical fiber, wherein the stationary ferrule permits the first optical joint end to remain exposed;
a second optical fiber having a second optical joint end and a second longitudinal axis;
a rotatable ferrule substantially disposed around the second optical fiber, wherein the rotatable ferrule permits the second optical joint end to remain exposed, wherein the first optical joint end is proximate to the second optical joint end, and the first longitudinal axis is substantially aligned with the second longitudinal axis; and
an alignment sleeve substantially disposed around the stationary ferrule and the rotatable ferrule, the alignment sleeve permitting the rotatable ferrule to rotate with respect to the stationary ferrule while maintaining the substantial axial alignment.

5. The rotary optical joint assembly of claim 4, wherein the rotatable optical coupler further comprises:
an input electrical connection providing electricity to active components on a first side of the rotatable optical coupler;
a set of electrical slip rings conveying electricity across the rotatable optical coupler; and
an output electrical connection receiving electricity from the set of electrical slip rings and conveying electricity to active components on a second side of the rotatable optical coupler.

6. The rotary optical joint assembly of claim 5, wherein the set of electrical slip rings conveys low speed electrical data signals across the rotatable optical coupler.

7. The rotary optical joint assembly of claim 4, wherein the rotatable ferrule and the alignment sleeve are configured to precess transversely, thereby maintaining substantial axial alignment with the stationary ferrule.

8. A rotatable optical coupler, comprising:
a first optical fiber having a first optical joint end and a first longitudinal axis;
a stationary ferrule substantially disposed around the first optical fiber, wherein the stationary ferrule permits the first optical joint end to remain exposed;
a second optical fiber having a second optical joint end and a second longitudinal axis;
a rotatable ferrule substantially disposed around the second optical fiber, wherein the rotatable ferrule permits the second optical joint end to remain exposed;
wherein the first optical joint end is proximate to the second optical joint end, and the first longitudinal axis is substantially aligned with the second longitudinal axis; and
an alignment sleeve substantially disposed around the stationary ferrule and the rotatable ferrule, the alignment sleeve permitting the rotatable ferrule to rotate with respect to the stationary ferrule while maintaining the substantial axial alignment.

9. The rotatable optical coupler of claim 8, further comprising:
an input electrical connection providing electricity to active components on a first side of the rotatable optical coupler;
a set of electrical slip rings conveying electricity across the rotatable optical coupler; and
an output electrical connection receiving electricity from the set of electrical slip rings and conveying electricity to active components on a second side of the rotatable optical coupler.

10. The rotatable optical coupler of claim 9, wherein the set of electrical slip rings conveys low speed electrical data signals across the rotatable optical coupler.

11. The rotatable optical coupler of claim 8, wherein the rotatable ferrule and the alignment sleeve are configured to precess transversely, thereby maintaining substantial axial alignment with the stationary ferrule.

12. A method of transmitting optical signals across a rotary joint, the method comprising:
transmitting an optical signal across the rotary optical joint using a first optical fiber on a first side of the rotary optical joint in communication with a second optical fiber on a second side of the rotary optical joint, the optical communication facilitated using a rotatable optical coupler; and
processing the transmitted optical signal using an active optical component to compensate for at least a portion of signal loss or other signal imperfections incurred from the transmitting, the processing performed by a local transceiver.

13. The method of claim 12, further comprising preparing the optical signal for longer distance transmission using the active optical component.

14. The method of claim 13, wherein the optical fiber between the rotatable optical coupler and the local transceiver is a multi-mode fiber.

* * * * *